(12) United States Patent
Harihara Subramanian et al.

(10) Patent No.: US 11,449,048 B2
(45) Date of Patent: Sep. 20, 2022

(54) MOVING BODY CONTROL APPARATUS, MOVING BODY CONTROL METHOD, AND TRAINING METHOD

(71) Applicant: Panasonic Intellectual Property Corporation of America, Torrance, CA (US)

(72) Inventors: Karthikk Harihara Subramanian, Singapore (SG); Bin Zhou, Singapore (SG); Sheng Mei Shen, Singapore (SG); Sugiri Pranata Lim, Singapore (SG)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 112 days.

(21) Appl. No.: 16/362,846

(22) Filed: Mar. 25, 2019

(65) Prior Publication Data
US 2019/0219998 A1 Jul. 18, 2019

Related U.S. Application Data

(63) Continuation of application No. PCT/US2018/038433, filed on Jun. 20, 2018.
(Continued)

(51) Int. Cl.
*G05D 1/00* (2006.01)
*B25J 9/16* (2006.01)
(Continued)

(52) U.S. Cl.
CPC .............. *G05D 1/0016* (2013.01); *B25J 9/16* (2013.01); *G05D 1/0022* (2013.01);
(Continued)

(58) Field of Classification Search
CPC .. G05D 1/0016; G05D 1/0022; G05D 1/0033; G05D 1/0038; G06N 20/00; G06N 3/08; B25J 9/16; G09G 5/00
See application file for complete search history.

(56) References Cited

U.S. PATENT DOCUMENTS 7,783,391 B2 * 8/2010 Jeong ........................ A61F 4/00
701/1
10,576,636 B1 * 3/2020 Islam ...................... B25J 9/1692
(Continued)

FOREIGN PATENT DOCUMENTS

CN 106080590 11/2016
JP 11-282530 10/1999
(Continued)

OTHER PUBLICATIONS

International Search Report dated Sep. 11, 2018 in International (PCT) Application PCT/US2018/038433.

*Primary Examiner* — Peter D Nolan
*Assistant Examiner* — Mikko Okechukwu Obioha
(74) *Attorney, Agent, or Firm* — Wenderoth, Lind & Ponack, L.L.P.

(57) ABSTRACT

A moving body control apparatus for controlling a moving body includes: an acquisition device that acquires a control command for the moving body and an image of a view in the traveling direction of the moving body; and an information processing device that uses a machine learning model to output a control parameter for controlling the moving body, using the control command and the image acquired by the acquisition device as inputs.

8 Claims, 7 Drawing Sheets

Related U.S. Application Data

(60) Provisional application No. 62/525,979, filed on Jun. 28, 2017.

(51) Int. Cl.
    *G09G 5/00*     (2006.01)
    *G06N 20/00*     (2019.01)
    *G06N 3/08*     (2006.01)

(52) U.S. Cl.
    CPC ......... *G05D 1/0033* (2013.01); *G05D 1/0038* (2013.01); *G06N 3/08* (2013.01); *G06N 20/00* (2019.01); *G09G 5/00* (2013.01)

(56) References Cited

U.S. PATENT DOCUMENTS

| | | | |
|---|---|---|---|
| 10,599,155 B1* | 3/2020 | Konrardy | B60W 60/0011 |
| 10,922,585 B2* | 2/2021 | Abhiram | G06K 9/00771 |
| 2012/0166200 A1* | 6/2012 | Han | G10L 15/22 |
| | | | 704/270 |
| 2015/0032258 A1* | 1/2015 | Passot | G06N 3/008 |
| | | | 700/250 |
| 2015/0217449 A1* | 8/2015 | Meier | G05B 13/027 |
| | | | 700/257 |
| 2016/0334229 A1* | 11/2016 | Ross | G08G 1/161 |
| 2017/0213457 A1* | 7/2017 | Sato | B60W 30/095 |
| 2017/0357257 A1 | 12/2017 | Yang et al. | |
| 2018/0032082 A1* | 2/2018 | Shalev-Shwartz | G06N 7/005 |
| 2018/0247160 A1* | 8/2018 | Rohani | G05D 1/0088 |
| 2019/0034818 A1* | 1/2019 | Murakami | B25J 19/06 |
| 2019/0118394 A1* | 4/2019 | Yamada | G06K 9/3241 |
| 2019/0188542 A1* | 6/2019 | Wagenmaker | G06K 9/6256 |
| 2019/0219998 A1* | 7/2019 | Harihara Subramanian | |
| | | | G09G 5/00 |
| 2019/0294159 A1* | 9/2019 | Pedersen | G05D 1/0088 |
| 2019/0310648 A1* | 10/2019 | Yang | G06N 20/00 |
| 2019/0317502 A1* | 10/2019 | Guo | G05D 1/12 |
| 2019/0391582 A1* | 12/2019 | Jung | B60Q 1/525 |
| 2020/0242154 A1* | 7/2020 | Haneda | G06K 9/3241 |
| 2021/0012193 A1* | 1/2021 | Yasutomi | G06N 3/084 |

FOREIGN PATENT DOCUMENTS

| | | |
|---|---|---|
| JP | 2009-199572 | 9/2009 |
| JP | 2011-238054 | 11/2011 |
| JP | 2013-113274 | 6/2013 |

* cited by examiner

FIG. 7

|  | Smoothness | White-line-crossing count |
|---|---|---|
| Before training | 0.0155082 | 3 |
| After first training | 0.008025 | 0 |
| After second training | 0.007626 | 0 |

MOVING BODY CONTROL APPARATUS, MOVING BODY CONTROL METHOD, AND TRAINING METHOD

CROSS REFERENCE TO RELATED APPLICATIONS

This is a continuation application of PCT International Application No. PCT/US2018/038433 filed on Jun. 20, 2018, designating the United States of America, which is based on and claims priority of U.S. Provisional Patent Application No. 62/525,979 filed on Jun. 28, 2017. The entire disclosures of the above-identified applications, including the specifications, drawings and claims are incorporated herein by reference in their entirety.

FIELD

One or more exemplary embodiments disclosed herein relate generally to a moving body control apparatus for controlling a moving body

BACKGROUND

Conventionally, a technique for controlling a moving body, representative examples of which include a vehicle, a robot, etc., is known.

For example, Patent Literature (PTL) 1 discloses a technique for controlling autonomous driving of a vehicle based on a pre-prepared three-dimensional map. Moreover, for example, PTL 2 discloses a technique for controlling autonomous driving of a vehicle in accordance with a set driving route.

CITATION LIST

Patent Literature

[PTL 1] Japanese Unexamined Patent Application Publication No. 2009-199572
[PTL 2] Japanese Unexamined Patent Application Publication No. H11-282530

SUMMARY

Technical Problem

With the technique disclosed in PTL 1, control of autonomous driving of a vehicle is limited in scope to a pre-prepared three-dimensional map. Moreover, with the technique disclosed in PTL 2, control of autonomous driving of a vehicle is limited in scope to a set driving route.

In view of this, one non-limiting and exemplary embodiment provides a moving body control apparatus, a moving body control method, and a training method capable of achieving autonomous driving of a moving body characterized by a higher degree of freedom than conventional art.

Solution to Problem

A moving body control apparatus according to one aspect of the present disclosure is for controlling a moving body and includes: an acquisition device for acquiring a control command for the moving body and an image of a view in a traveling direction of the moving body; and an information processing device that uses a machine learning model to output a control parameter for controlling the moving body, using the control command and the image acquired by the acquisition device as inputs.

Moreover, a moving body control method according to one aspect of the present disclosure is for controlling a moving body, and includes: a first step of acquiring a control command for the moving body and an image of a view in a traveling direction of the moving body; and a second step of using a machine learning model to output a control parameter for controlling the moving body, using the control command and the image acquired in the first step as inputs.

Moreover, a training method according to one aspect of the present disclosure is for a moving body control apparatus that controls a moving body using a machine learning model, and includes a first step of training the machine learning model using first training data that takes a control command for the moving body and an image of a view in a traveling direction of the moving body as inputs, and includes a control parameter for controlling the moving body as a correct answer.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects

A moving body control apparatus, a moving body control method, and a training method according to one aspect of the present disclosure are capable of achieving autonomous driving characterized by a higher degree of freedom than conventional art.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 7 illustrates a result of a test in which a machine learning model according to an embodiment was trained using constraint conditions.

Figure 1:
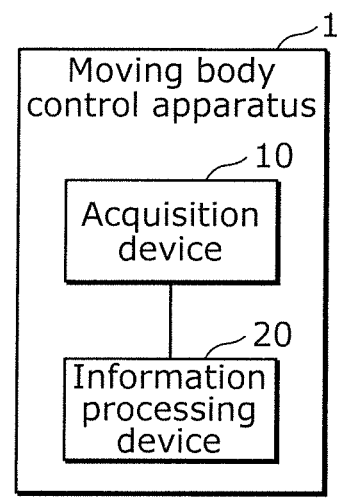
FIG. 1 is a block diagram of a configuration of a moving body control apparatus according to an embodiment.

DESCRIPTION OF EMBODIMENTS (Underlying Knowledge Forming Basis of the Present Disclosure)

A moving body control apparatus according to one aspect of the present disclosure is for controlling a moving body and includes: an acquisition device for acquiring a control command for the moving body and an image of a view in a traveling direction of the moving body; and an information processing device that uses a machine learning model to output a control parameter for controlling the moving body, using the control command and the image acquired by the acquisition device as inputs.

Here, the control command is a signal indicating an intention to maneuver the moving body, such as turn left, turn right, stop, go forward, make a U-turn, change lanes, etc., and the control parameter is a signal indicating a physical quantity for controlling the moving body 100, such as a speed and/or a steering angle.

The moving body control apparatus described above controls the moving body using a control command for the moving body and an image of a view in the traveling direction of the moving body.

Accordingly, when the moving body is autonomously driven using the moving body control apparatus described above, there is no need for a pre-prepared three-dimensional map, and there is no need to specify a specific driving position, which are necessary in conventional autonomous driving of a moving body. Moreover, selection of something other than a fixed driving route is possible.

Accordingly, with the moving body control apparatus described above, it is possible to autonomously drive the moving body with a higher degree of freedom than conventional art.

A moving body control method according to one aspect of the present disclosure is for controlling a moving body, and includes: a first step of acquiring a control command for the moving body and an image of a view in a traveling direction of the moving body; and a second step of using a machine learning model to output a control parameter for controlling the moving body, using the control command and the image acquired in the first step as inputs.

The moving body control method described above controls the moving body using a control command for the moving body and an image of a view in the traveling direction of the moving body.

Accordingly, when the moving body is autonomously driven using the moving body control method described above, there is no need for a pre-prepared three-dimensional map, and there is no need to specify a specific driving position, which are necessary in conventional autonomous driving of a moving body. Moreover, selection of something other than a fixed driving route is possible.

Accordingly, with the moving body control method described above, it is possible to autonomously drive the moving body with a higher degree of freedom than conventional art.

A training method according to one aspect of the present disclosure is for a moving body control apparatus that controls a moving body using a machine learning model, and includes a first step of training the machine learning model using first training data that takes a control command for the moving body and an image of a view in a traveling direction of the moving body as inputs, and includes a control parameter for controlling the moving body as a correct answer.

The machine learning model trained via the training method described above controls the moving body using a control command for the moving body and an image of a view in the traveling direction of the moving body.

Accordingly, when the moving body is autonomously driven using the machine learning model trained via the training method described above, there is no need for a pre-prepared three-dimensional map, and there is no need to specify a specific driving position, which are necessary in conventional autonomous driving of a moving body. Moreover, selection of something other than a fixed driving route is possible.

Accordingly, with the training method described above, it is possible to autonomously drive the moving body with a higher degree of freedom than conventional art.

The following describes a specific example of a moving body control apparatus according to one aspect of the present disclosure with reference to the drawings. Note that the exemplary embodiment described below indicates a specific example of the present disclosure. The numerical values, shapes, materials, elements, the arrangement and connection of the elements, steps (processes), the processing order of the steps, etc., shown in the following exemplary embodiment are mere examples, and therefore do not limit the present disclosure. Therefore, among elements in the following exemplary embodiment, those not recited in any one of the independent claims defining the broadest aspect are described as optional elements. Furthermore, the respective figures are schematic diagrams and are not necessarily precise illustrations.

Embodiment

[1. Moving Body Control Apparatus Configuration]

FIG. 1 is a block diagram of a configuration of a moving body control apparatus 1 according to the embodiment.

Figure 2:
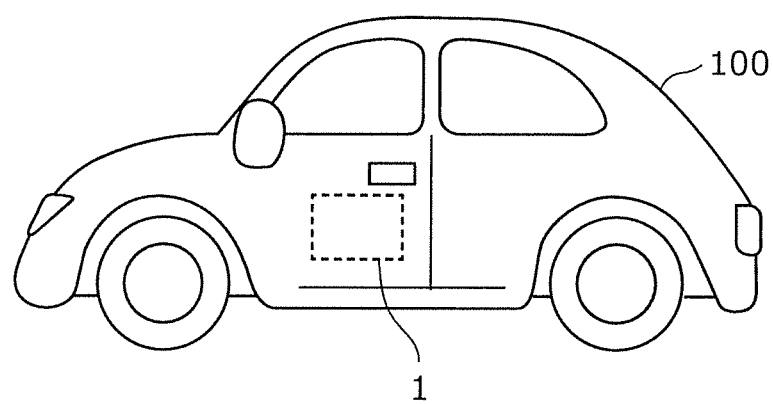
FIG. 2 schematically illustrates one example in which a moving body control apparatus according to an embodiment is installed in a moving body, which is control target.

FIG. 2 schematically illustrates one example in which the moving body control apparatus 1 is installed in a moving body 100, which is control target. In FIG. 2, although the moving body 100 is illustrated as an automobile, the control target of the moving body control apparatus 1 is not limited to an automobile; the control target may be any controllable moving body, such as an autonomous robot, for example. Moreover, some or all of the elements in the moving body control apparatus 1 need not be equipped on the moving body 100, which is the control target.

As illustrated in FIG. 1, the moving body control apparatus 1 includes an acquisition device 10 and an information processing device 20.

The acquisition device 10 acquires a control command for the moving body 100 and an image of a view in the traveling direction of the moving body 100. The control command is a signal indicating an intention to maneuver moving body 100, such as turn left, turn right, stop, go forward, make a U-turn, change lanes, etc. Here, the control command is exemplified as including at least one of turn left, turn right, stop, go forward, make a U-turn, and change lanes.

The acquisition device 10 may include, for example, an input device that acquires a control command for the moving body 100 by receiving, from a user of the moving body control apparatus 1, an input of a control command for the moving body 100. Moreover, the acquisition device 10 may include, for example, a receiver that acquires a control command for the moving body 100 by receiving a control command for the moving body 100 output from an external device with which communication is possible. Moreover, the acquisition device 10 may include an image capturing device that is disposed in a front portion of the moving body 100 and acquires an image of a view in the traveling direction of the moving body 100 by capturing an image of a view in the traveling direction of the moving body 100. For example, the image capturing device may be a digital video camera including an image sensor. In such cases, the acquisition device 10 acquires each frame of a video captured by the digital video camera as an image of a view in the traveling direction of the moving body 100. Moreover, the acquisition device 10 may include, for example, a receiver that acquires an image of a view in the traveling direction of the moving body 100 by receiving, from an external image capturing device with which communication is possible, an image of a view in the traveling direction of the moving body 100 captured by the image capturing device.

The information processing device 20 uses a machine learning model to output a control parameter for controlling the moving body 100, using the control command and the image acquired by the acquisition device 10 as inputs. The control parameter is a signal indicating a physical quantity for controlling the moving body 100, such as a speed and/or a steering angle. Here, the control parameter is exemplified as including at least one of a speed and a steering angle. When a control parameter is output from the information processing device 20, the moving body 100, for example, speeds up, slows down, and/or steers such that the operating state of the moving body 100 is consistent with the physical quantity indicated by the control parameter.

Moreover, the information processing device 20 trains a machine learning model by using training data or a constraint condition.

The information processing device 20 may include, for example, a processor capable of communicating with the acquisition device 10 and memory. In such cases, the information processing device 20 can implement various processes by the processor executing a program stored in the memory.

The machine learning model is a model that is trained to output a control parameter when a control command and an image of a view in the traveling direction of the moving body 100 is input. The machine learning model may be, for example, a neural network model. Here, the machine learning model is exemplified as a neural network model.

[2. Machine Learning Model Configuration]

Figure 3:
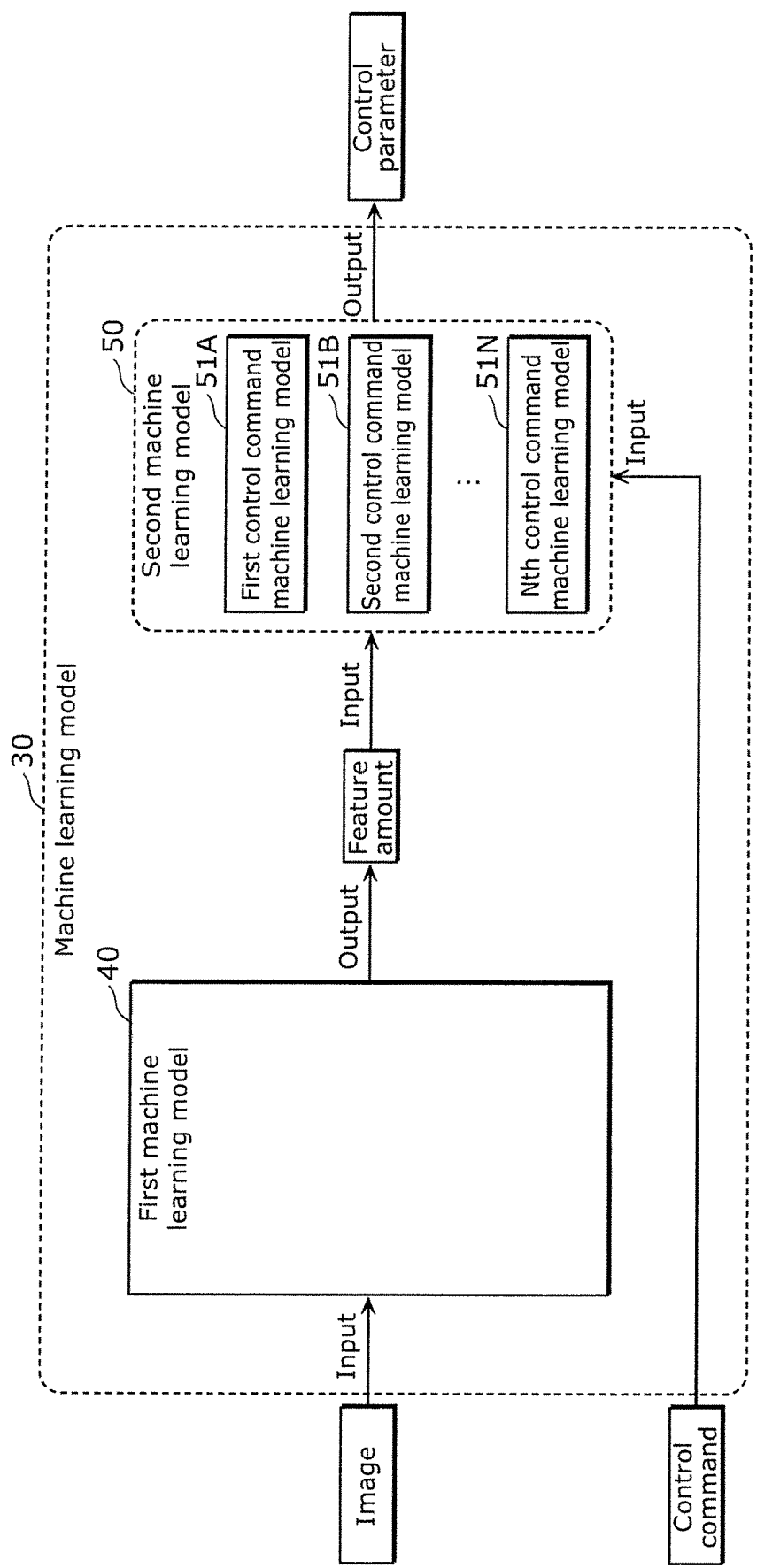
FIG. 3 schematically illustrates a configuration of a machine learning model according to an embodiment.

FIG. 3 schematically illustrates a configuration of a machine learning model 30 used by the information processing device 20.

As illustrated in FIG. 3, the machine learning model 30 includes a first machine learning model 40 and a second machine learning model 50.

The first machine learning model 40 is a model that is trained to, when an image of a view in the traveling direction of the moving body 100 is input, calculate a feature amount of an object from the input image.

The second machine learning model 50 is a model that is trained to calculate a control parameter when the feature amount output from the first machine learning model 40 and a control command are input.

The second machine learning model 50 includes a first control command machine learning model 51A and a second control command machine learning model 51B through Nth (N is an integer greater than or equal to 2) control command machine learning model 51N respectively corresponding to N control commands input into the machine learning model 30. Hereinafter, when it is not necessary to explicitly differentiate between the first control command machine learning model 51A and the second control command machine learning model 51B through Nth control command machine learning model 51N, these are referred to as control command learning models 51. Each control command learning model 51 is a model that is trained to calculate a control parameter when a feature amount associated the control command that the model correspond to is input. When a control command is input, the second machine learning model 50 selects a control command learning model 51 that corresponds to the input control command. Then, via the selected control command learning model 51, the second machine learning model 50 outputs a control parameter using, as an input, a feature amount that is output from the first machine learning model 40 and associated with the control command.

[3. Machine Learning Model Training Method]

Hereinafter, a training method for training the machine learning model 30 configured as described above will be described.

Figure 4:
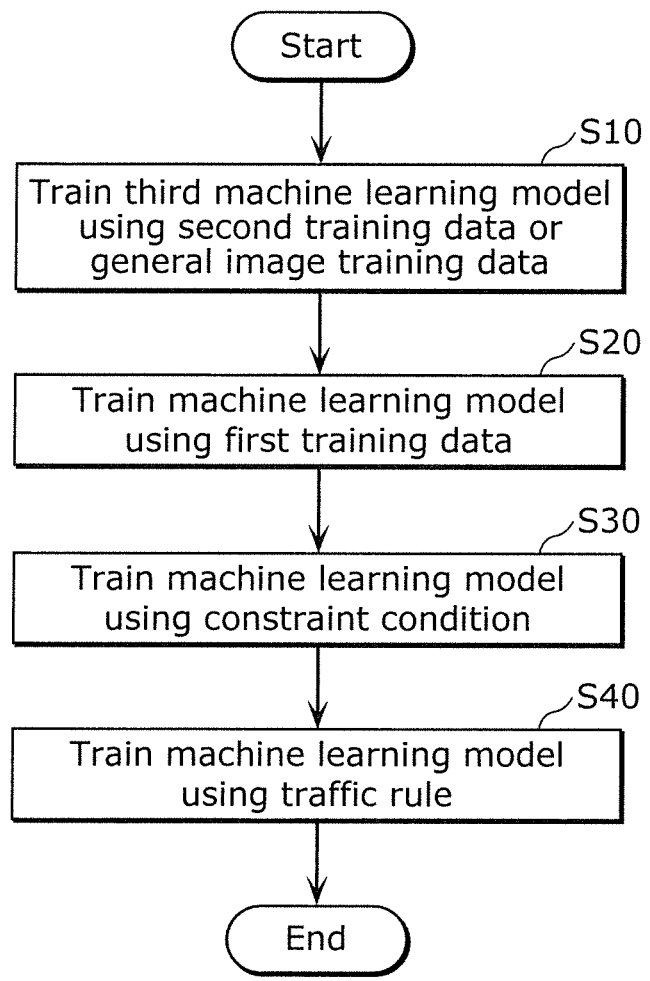
FIG. 4 is a flowchart of a training method for training a machine learning model according to an embodiment.

FIG. 4 is a flowchart of a training method used by the information processing device 20 for training the machine learning model 30.

As illustrated in FIG. 4, as the first step, the information processing device 20 trains the first machine learning model 40 as a classifier, using training data that takes images as an input and includes labels attached to the images as correct answers (step S10). Applicable training data includes training data that takes images of a view in the traveling direction of the moving body 100 as an input, and includes control commands as correct answers (hereinafter referred to as "second training data"), and training data that takes general images not necessarily related to the moving body 100 as an input, and includes label information attached to the general images as correct answers (hereinafter referred to as "general image training data"). Note that the training may use both the second training data and the general image training data. Note that in step S10, for example, the second training data is used. When both the second training data and the general image training data are used in the training, the training is, for example, performed in steps, using the first the general image training data first and the second training data subsequently.

Here, sets of an image of a view in the traveling direction of the moving body 100 and a control command used in the second training data are acquired in advance by way of the user of the moving body control apparatus 1 operating the moving body 100. Stated differently, in advance, the user of the moving body control apparatus 1 repeatedly operates the moving body 100 in accordance with the N control commands to be inputted into the machine learning model 30, to acquire a plurality of images of a view in the traveling direction of the moving body 100, each corresponding to one of the N control commands. The user of the moving body control apparatus 1 then groups the N control commands and the corresponding plurality of images of a view in the traveling direction of the moving body 100 to generate the second training data.

Figure 5A:
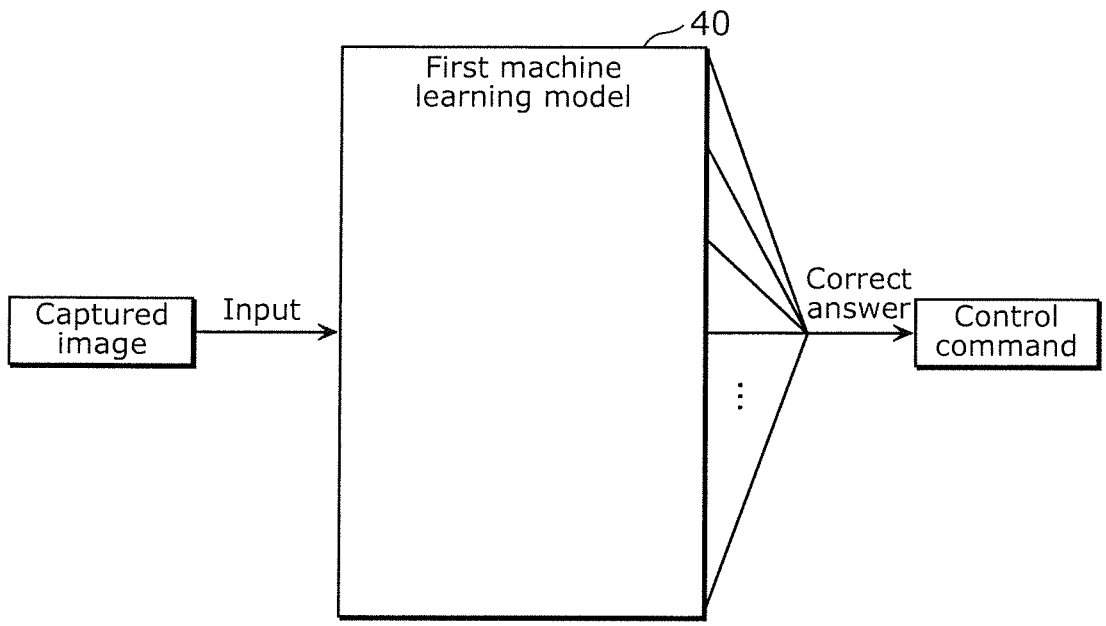
FIG. 5A schematically illustrates training of a machine learning model according to an embodiment using second training data.
Figure 5B:
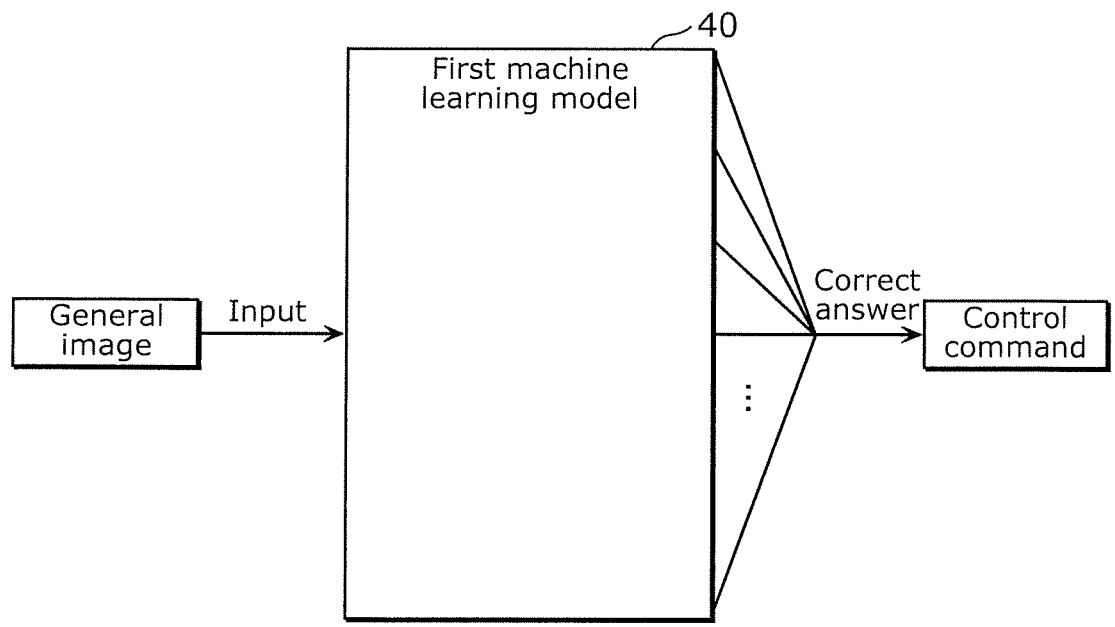
FIG. 5B schematically illustrates training of a machine learning model according to an embodiment using general image training data.

FIG. 5A schematically illustrates the information processing device 20 in step S10 training the first machine learning model 40 as a classifier using the second training data. FIG. 5B schematically illustrates the information processing device 20 in step S10 training the first machine learning model 40 as a classifier using the general image training data.

As illustrated in FIG. 5A, in the processing in step S10, the information processing device 20 inputs, into the first machine learning model 40, a plurality of images of a view in the traveling direction of the moving body 100 labeled with control commands as correct answers, for the N control commands. The information processing device 20 then trains the first machine learning model 40 as a classifier that classifies each input image of a view in the traveling direction of the moving body 100 into the corresponding control command.

Next, as the second step, the information processing device 20 trains the machine learning model 30, via a regression technique, using training data that takes control commands and images of a view in the traveling direction of the moving body 100 as inputs, and includes control parameters as correct answers (hereinafter referred to as "first training data") (step S20).

Here, sets of a control command, an image of a view in the traveling direction of the moving body 100, and a control parameter used in the first training data are acquired in advance by way of the user of the moving body control apparatus 1 operating the moving body 100. Stated differently, in advance, the user of the moving body control apparatus 1 repeatedly operates the moving body 100 in accordance with the N control commands to be inputted into the machine learning model 30, to acquire a plurality of images of a view in the traveling direction of the moving body 100, each corresponding to one of the N control commands, and a plurality of control parameters, each corresponding to one of the N control commands. The user of the moving body control apparatus 1 then groups the plurality of images of a view in the traveling direction of the moving body 100, the corresponding control commands, and the corresponding control parameter to generate the first training data.

Figure 6:
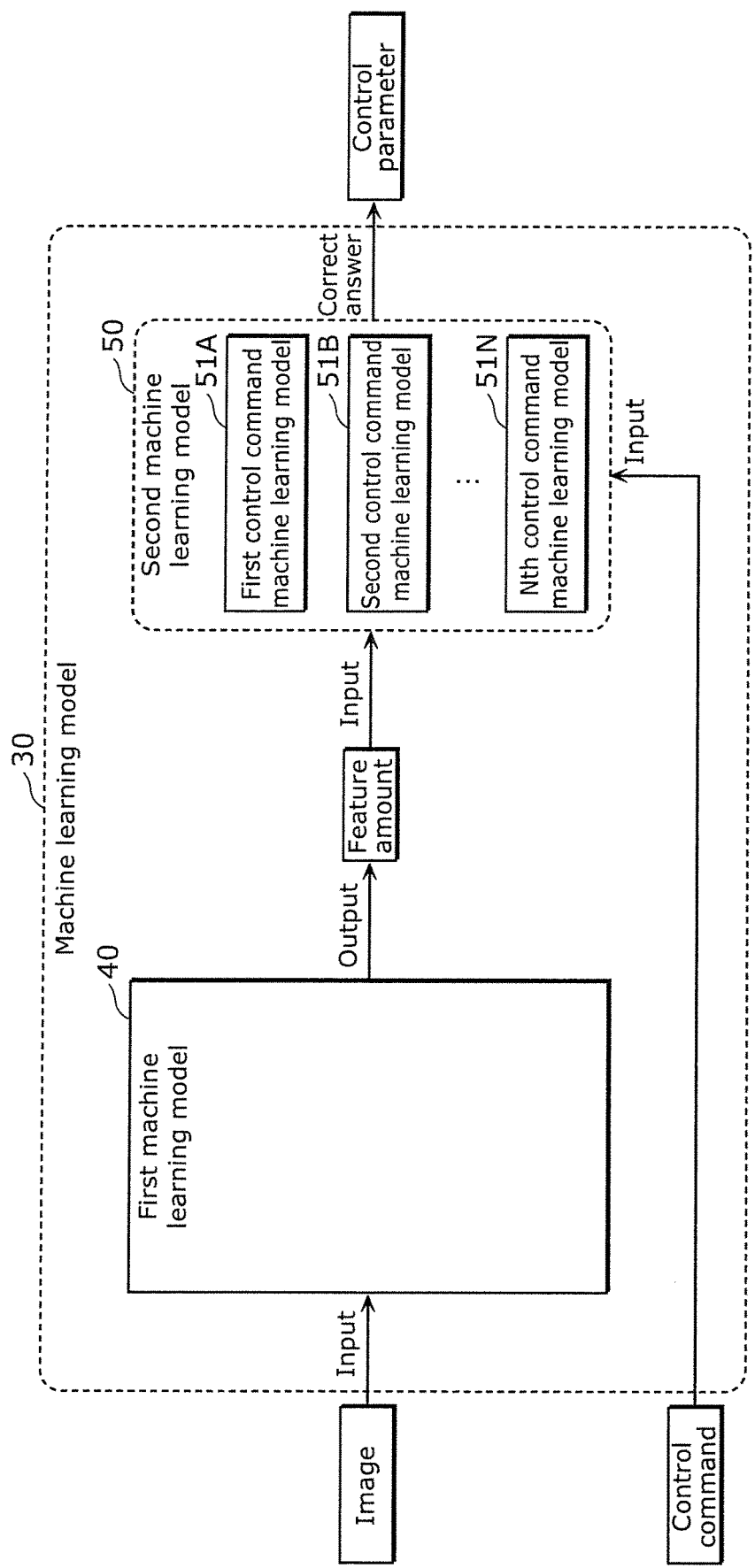
FIG. 6 schematically illustrates training of a machine learning model according to an embodiment using first training data.

FIG. 6 schematically illustrates the information processing device 20 in step S20 training the machine learning model 30, via a regression technique, using the first training data.

As illustrated in FIG. 6, in the processing in step S20, the information processing device 20 trains the machine learning model 30, via a regression technique, about a plurality of images of a view in the traveling direction of the moving body 100, by using the plurality of images of a view in the traveling direction of the moving body 100 and corresponding control commands as inputs, and using corresponding control parameters as correct answers. When the processing in step S10 and the processing in step S20 are complete, the machine learning model 30 is trained to a level that is usable by the information processing device 20 to control the moving body 100 (hereinafter referred to as a "usable level").

Note that in the processing in step S20, the information processing device 20 may train the machine learning model 30 via a regression technique, using the first training data, in a state in which the first machine learning model 40 is fixed as a "trained" model (i.e., in a state in which the first machine learning model 40 is no longer to be further trained).

Next, as the third step, the information processing device 20 trains the machine learning model 30 via a regression technique, using a constraint condition that restricts an operating state of the moving body 100 (step S30). The processing in step S30 trains the moving body 100 to move more smoothly. Here, smooth movement of the moving body 100 is movement unaccompanied by sharp changes in moving velocity and sharp changes in steering angle.

A constraint condition may be, for example, a condition that imposes an upper limit for a rate of change in the moving velocity v of the moving body 100 per unit time, expressed as dv/dt (in other words, the rate of acceleration of the moving body 100) (hereinafter, this condition is referred to as "constraint condition 1").

Moreover, the constraint condition may be, for example, a condition stipulating that when the moving body 100 is driving on a road marked with a white line, the moving body 100 is not to cross the white line (hereinafter, this condition is referred to as "constraint condition 2").

Moreover, the constraint condition may be, for example, a condition that imposes an upper limit for a rate of change in the steering angle of the moving body 100 per unit time or per unit distance.

FIG. 7 illustrates a result of a test in which the information processing device 20 trained the machine learning model 30 via a regression technique, using constraint condition 1 and constraint condition 2.

In FIG. 7, smoothness 71 is a benchmark indicating a degree of smoothness in the movement of the moving body 100 reflecting the rate of change in moving velocity of the moving body 100 per unit time and the rate of change in the steering angle of the moving body 100 per unit time. The smaller the value is, the smoother the movement of the moving body 100 is. Moreover, white-line-crossing count 72 indicates the number of times the moving body 100 crossed a white line when driving on a road marked with a white line.

As illustrated in FIG. 7, as a result of the information processing device 20 training the machine learning model 30 via a regression technique, using constraint condition 1 and constraint condition 2, one can see that the machine learning model 30 is capable of controlling moving body 100 such that the moving body 100 moves more smoothly and does not cross a white line.

Note that in the processing in step S30, the information processing device 20 may train the machine learning model 30 via a regression technique, using a constraint condition, in a state in which the first machine learning model 40 is fixed as a "trained" model.

Finally, as the fourth step, the information processing device 20 trains the machine learning model 30 via a regression technique, using a traffic rule to be obeyed by the moving body 100 (step S40). The processing in step S40 is training for causing the moving body 100 move in accordance with a traffic rule.

A traffic rule may be, for example, a condition stipulating that traffic lights are to be obeyed.

Moreover, a traffic rule may be, for example, a condition stipulating that driving lanes are not to be changed.

Note that in the processing in step S40, the information processing device 20 may train the machine learning model 30 via a regression technique, using a traffic rule, in a state in which the first machine learning model 40 is fixed as a "trained" model.

When the processing in step S40 is complete, the information processing device 20 ends training of the machine learning model 30.

Note that, hereinbefore, as one example of the training method for training the machine learning model 30, the information processing device 20 is described as performing the processing in step S40 after the processing in step S30 is complete. However, in another example of the training method, the information processing device 20 may perform the processing in step S30 after the processing in step S40 is complete.

Moreover, in the training method for training the machine learning model 30, both the processing in step S30 and the processing in step S40 are for improving the quality of movement of the moving body 100. Accordingly, depending on the desired level of quality of movement of the moving body 100, the information processing device 20 may perform only one of the processing in step S30 and the processing in step S40, and may perform neither the processing in step S30 nor the processing in step S40.

Moreover, even if the information processing device 20 performs the processing in step S25 (to be described later) in which an aspect of the processing in step S20 has been changed, instead of performing the processing in step S10 and the processing in step S20, the information processing device 20 can train the machine learning model 30 to a usable level. However, as a result of repeated tests, it was found that a training method in which the processing in step S25 is performed instead of the processing in step S10 and the processing in step S20 reduced the learning efficiency of machine learning model 30 compared to the training method in which the processing in step S10 and the processing in step S20 were performed. Accordingly, the training method in which the processing in step S10 and the processing in step S20 are performed is beneficial. Here, the processing in step S25 is processing in which the information processing device 20 trains the entire machine learning model 30 via a regression technique, using the first training data, in a state in which the first machine learning model 40 has not been trained in advance (i.e., in a state in which step S10 has not been performed).

[4. Moving Body Control Method]

The moving body control apparatus 1 performs a moving body control process for controlling the moving body 100 by using the machine learning model 30 trained via the above-described training method.

Hereinafter, a moving body control process performed by the moving body control apparatus 1 will be described.

Figure 8:
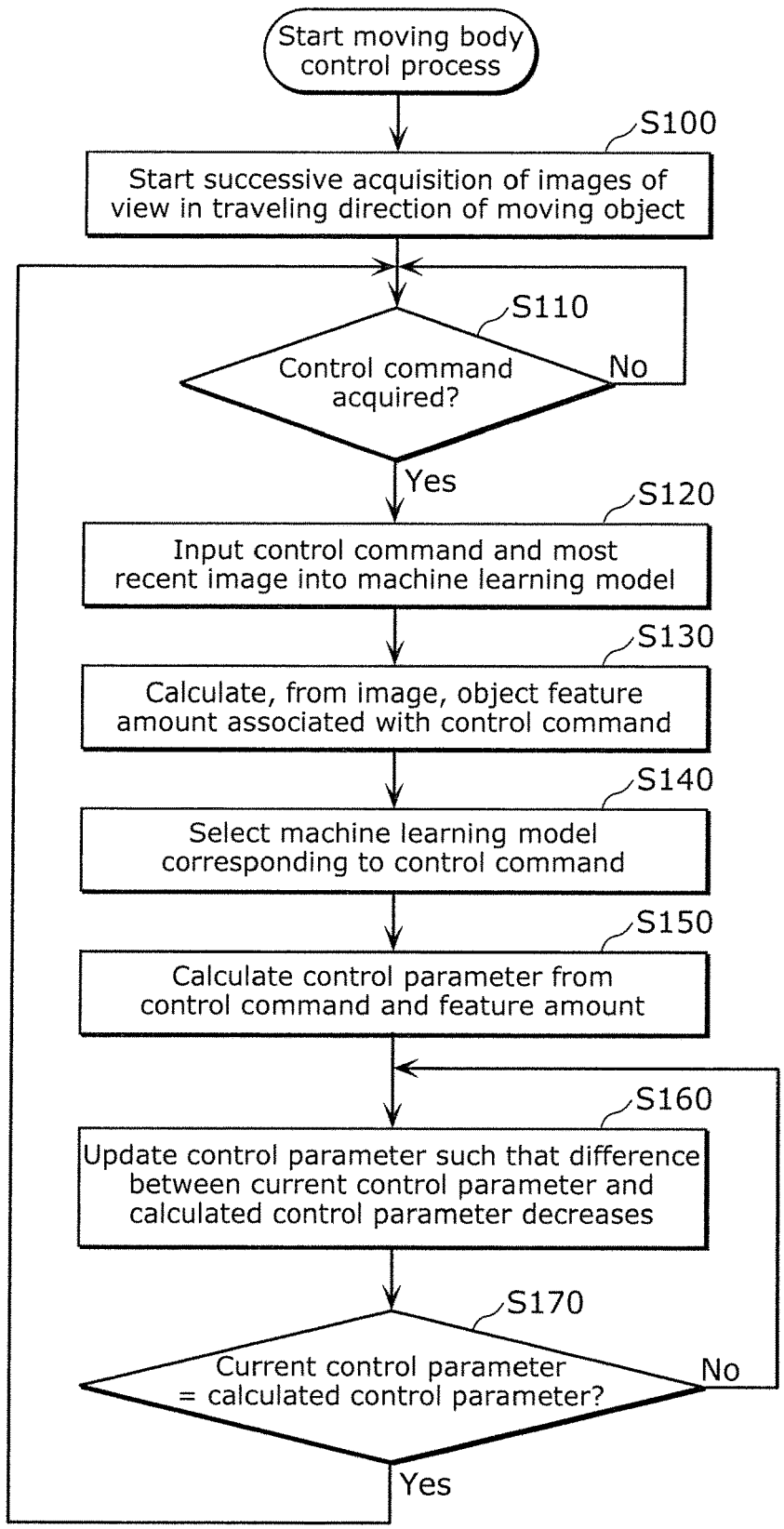
FIG. 8 is a flowchart of moving body control process according to an embodiment.

FIG. 8 is a flowchart of the moving body control process.

For example, the moving body control process starts when the user of the moving body control apparatus 1 performs an operation on the moving body control apparatus 1 signifying starting the moving body control process.

When the moving body control process starts, the acquisition device 10 successively acquires images of a view in the traveling direction of the moving body 100 (step S100).

Thereafter, when the acquisition device 10 acquires a control command for the moving body 100 (yes in step S110 after repeated results of no in step S110), the information processing device 20 inputs, into the machine learning model 30, the control command acquired by the acquisition device 10 and the most recent image of a view in the traveling direction of the moving body 100 acquired by the acquisition device 10 (step S120).

When the control command and the image have been input into the machine learning model 30, the first machine learning model 40 calculates, from the image, a feature amount associated with the control command and indicating a feature of an object in the image (step S130).

When the feature amount associated with the control command has been calculated, the second machine learning model 50 selects the control command learning model 51 that corresponds to the control command (step S140). Then, the selected control command learning model 51 calculates a control parameter from the feature amount associated with the control command (step S150). When the control parameter has been calculated, the information processing device 20 updates the control parameter such that the difference between the current control parameter and the calculated control parameter decreases (step S160), and outputs the updated control parameter. The method for determining the update interval may be, for example, Proportional Integral Differential (PID) control. Note that the control parameter may be updated with the calculated control parameter on the spot, without using a gradual change.

When the control parameter has been output, the information processing device 20 determines whether the current control parameter and the calculated control parameter are equal or not (step S170).

In the processing in step S170, when the current control parameter and the calculated control parameter are determined to be equal (yes in step S170), the moving body control apparatus 1 returns to step S110, and performs the subsequent steps.

In the processing in step S170, when the current control parameter and the calculated control parameter are determined to not be equal (no in step S170), the moving body control apparatus 1 returns to step S160, and performs the subsequent steps.

[5. Discussion]

As described above, the moving body control apparatus 1 having the above configuration controls the moving body 100 using a control command for the moving body 100 and an image of a view in the traveling direction of the moving body 100.

Accordingly, when the moving body 100 is autonomously driven using the moving body control apparatus 1, there is no need for a pre-prepared three-dimensional map, and there is no need to specify a specific driving position. Moreover, selection of something other than a fixed driving route is possible.

Accordingly, with the moving body control apparatus 1, it is possible to autonomously drive the moving body 100 with a higher degree of freedom than conventional art.

Other Embodiments

Hereinbefore, a moving body control apparatus according to one aspect of the present disclosure has been described based on an exemplary embodiment, but the present disclosure is not limited to the above exemplary embodiment. Those skilled in the art will readily appreciate that many modifications are possible in the exemplary embodiment without materially departing from the novel teachings and advantages of the present disclosure. Accordingly, all such modifications are intended to be included within one or more aspects of the present disclosure.

For example, the information processing device 20 may include a plurality of computer devices capable of communicating with one another, and the various processes performed by the information processing device 20 may be implemented by distributed computing or cloud computing.

Moreover, some or all of the elements included in the information processing device 20 may be realized via a single system large scale integrated (LSI) circuit.

A system LSI circuit is a multifunctional LSI circuit manufactured by integrating a plurality of units on a single chip, and is specifically a computer system including, for example, a microprocessor, ROM (Read Only Memory), and RAM (Random Access Memory). A computer program is stored in the ROM. The system LSI circuit achieves its function as a result of the microprocessor operating according to the computer program.

Note that here, the terminology "system LSI circuit" is used, but depending on the degree of integration, the circuit may also referred to as IC, LSI circuit, super LSI circuit, or ultra LSI circuit. Moreover, the method of circuit integration is not limited to LSI. Integration may be realized with a specialized circuit or a general purpose processor. After the LSI circuit is manufactured, a field programmable gate array (FPGA) or a reconfigurable processor capable of reconfiguring the connections and settings of the circuit cells in the LSI circuit may be used.

Further, if an integrated circuit technology that replaces LSI emerges from advances in or derivations of semiconductor technology, integration of functional blocks using such technology may also be used. Application of biotechnology is also a possibility.

Each of the elements in each of the above embodiments may be configured in the form of an exclusive hardware product, or may be realized by executing a software program suitable for the element. Each of the elements may be realized by means of a program executing unit, such as a CPU or a processor, reading and executing the software program recorded on a recording medium such as a hard disk or semiconductor memory.

INDUSTRIAL APPLICABILITY

The present disclosure is widely applicable in control devices for control a moving body.

The invention claimed is:

1. A moving body control apparatus for controlling a moving body, the moving body control apparatus comprising:
    an acquisition device for acquiring one control command among N control commands for the moving body and an image of a view in a traveling direction of the moving body, where N is an integer greater than or equal to 2; and
    an information processing device that includes a feature amount extraction machine learning model and N control command machine learning models respectively corresponding to the N control commands,
    wherein the information processing device uses the feature amount extraction machine learning model to calculate, from the image acquired by the acquisition device, a feature amount associated with the one control command acquired by the acquisition device and indicating a feature of an object, selects one control command machine learning model corresponding to the one control command from among the N control command machine learning models, and uses the one control command machine learning model to output a control parameter for controlling the moving body, using the one control command acquired by the acquisition device and the feature amount as inputs,
    each of the N control commands is a signal indicating an intention to maneuver the moving body,
    the N control commands include a first control command which is one of turn left, turn right, stop, go forward, make a U-turn, and change lanes, and
    the N control command machine learning models include a first control command machine learning model which is one of a machine learning model for turning left, a machine learning model for turning right, a machine learning model for stopping, a machine learning model for going forward, a machine learning model for making a U-turn, and a machine learning model for changing lanes that corresponds to the first control command.

2. The moving body control apparatus according to claim 1, wherein
    each of the N control command machine learning models is a neural network model.

3. The moving body control apparatus according to claim 1, wherein
    the control parameter includes at least one of a speed and a steering angle.

4. A training method for the moving body control apparatus according to claim 1, the training method comprising:
    a first step of training the feature amount extraction machine learning model and the N control command machine learning models using first training data that takes the N control commands for the moving body and a plurality of images of a view in a traveling direction of the moving body as inputs, and includes a plurality of control parameters for controlling the moving body as correct answers, the plurality of images respectively corresponding to the N control commands, and the plurality of control parameters respectively corresponding to the N control commands.

5. The training method according to claim 4, further comprising:
    a second step of training the feature amount extraction machine learning model using second training data that takes the plurality of images as inputs and includes the N control commands as correct answers,
    wherein the second step is performed before the first step.

6. The training method according to claim 5, further comprising:
    a third step of training the feature amount extraction machine learning model and the N control command machine learning models using a constraint condition that restricts a possible operating state of the moving body,
    wherein the third step is performed after the second step.

7. The training method according to claim 5, further comprising:
    a fourth step of training the feature amount extraction machine learning model and the N control command machine learning models using a traffic rule to be obeyed by the moving body,
    wherein the fourth step is performed after the second step.

8. A moving body control method for controlling a moving body, the moving body control method comprising:
    a first step of acquiring one control command among N control commands for the moving body and an image of a view in a traveling direction of the moving body, where N is an integer greater than or equal to 2;
    a second step of using a feature amount extraction machine learning model to calculate, from the image acquired in the first step, a feature amount associated with the one control command acquired in the first step and indicating a feature of an object; and
    a third step of selecting one control command machine learning model corresponding to the one control command from among N control command machine learning models respectively corresponding to the N control commands, and using the one control command machine learning model to output a control parameter for controlling the moving body, using the one control command acquired in the first step and the feature amount as inputs,
    wherein each of the N control commands is a signal indicating an intention to maneuver the moving body,
    the N control commands include a first control command which is one of turn left, turn right, stop, go forward, make a U-turn, and change lanes, and
    the N control command machine learning models include a first control command machine learning model which is one of a machine learning model for turning left, a machine learning model for turning right, a machine learning model for stopping, a machine learning model for going forward, a machine learning model for making a U-turn, and a machine learning model for changing lanes that corresponds to the first control command.

\* \* \* \* \*